(12) United States Patent
Main et al.

(10) Patent No.: US 7,797,549 B2
(45) Date of Patent: Sep. 14, 2010

(54) SECURE METHOD AND SYSTEM FOR BIOMETRIC VERIFICATION

(75) Inventors: Alec Main, Ontario (CA); Harold J. Johnson, Ontario (CA)

(73) Assignee: Cloakware Corporation, Ottawa, Ontario (CA)

( * ) Notice: Subject to any disclaimer, the term of this patent is extended or adjusted under 35 U.S.C. 154(b) by 1092 days.

(21) Appl. No.: 10/743,784

(22) Filed: Dec. 24, 2003

(65) Prior Publication Data

US 2005/0138392 A1    Jun. 23, 2005

(30) Foreign Application Priority Data

Jun. 28, 2001 (CA) .................................. 2351868
Jun. 28, 2002 (WO) ..................... PCT/CA02/00999

(51) Int. Cl.
| | |
|---|---|
| G06F 7/04 | (2006.01) |
| G06F 17/30 | (2006.01) |
| G06F 21/00 | (2006.01) |
| G06F 11/30 | (2006.01) |
| G06F 12/14 | (2006.01) |
| B41K 3/38 | (2006.01) |
| G06K 19/00 | (2006.01) |
| H04L 9/14 | (2006.01) |
| H04L 9/32 | (2006.01) |

(52) U.S. Cl. ............................. 713/186; 726/2; 726/26; 713/194; 380/59; 340/5.26; 340/5.52; 340/5.82

(58) Field of Classification Search ................. 713/186, 713/194; 726/2, 16, 21, 26, 27; 380/59
See application file for complete search history.

(56) References Cited

U.S. PATENT DOCUMENTS 5,892,899 A    4/1999    Aucsmith et al.

(Continued)

FOREIGN PATENT DOCUMENTS

EP    0924657 A2    6/1999

(Continued)

OTHER PUBLICATIONS

Collberg et al., "A Taxonomy of Obfuscating Transformations", Technical Report, Department of Computer Science, University of Auckland, No. 148, Jul. 1997, pp. 1-36.

(Continued)

*Primary Examiner*—Nasser Moazzami
*Assistant Examiner*—Oscar A Louie
(74) *Attorney, Agent, or Firm*—Leslie A. Kinsman; Borden Ladner Gervais LLP

(57) ABSTRACT

There is a need in the computer software and data industries to protect content from unauthorized access to private information. Alphanumeric passwords have been shown to offer very weak protection. Biometrics (personal traits such as fingerprints and hand-written signatures) offer superior protection, but still have a number of weaknesses. The most significant weakness is that there is no existing way to protect the stored biometric data itself; and once a person's fingerprint data has been obtained by an attacker, the use of that fingerprint can no longer be considered secure. The invention solves the problem by securing the access software application that manages the biometric data using tamper-resistant encoding techniques. These tamper-resistant encoding techniques include: data-flow, control-flow, mass-data and white-box encoding.

5 Claims, 6 Drawing Sheets

U.S. PATENT DOCUMENTS

| | | | |
|---|---|---|---|
| 5,991,408 A | | 11/1999 | Pearson et al. |
| 5,995,630 A | * | 11/1999 | Borza .................... 380/54 |
| 6,006,328 A | | 12/1999 | Drake |
| 6,035,398 A | | 3/2000 | Bjorn |
| 6,035,403 A | | 3/2000 | Subbiah et al. |
| 6,085,320 A | * | 7/2000 | Kaliski, Jr. .................. 713/168 |
| 6,317,834 B1 | * | 11/2001 | Gennaro et al. ............. 713/186 |
| 6,484,260 B1 | * | 11/2002 | Scott et al. .................. 713/186 |
| 6,594,761 B1 | * | 7/2003 | Chow et al. ................. 713/190 |
| 6,655,585 B2 | * | 12/2003 | Shinn .......................... 235/382 |
| 6,668,325 B1 | * | 12/2003 | Collberg et al. ............. 713/194 |
| 6,779,114 B1 | * | 8/2004 | Chow et al. ................. 713/189 |
| 2003/0070079 A1 | * | 4/2003 | Cromer et al. ............. 713/186 |
| 2003/0088782 A1 | * | 5/2003 | Forrest ....................... 713/186 |
| 2003/0223624 A1 | * | 12/2003 | Hamid ....................... 382/124 |
| 2004/0005087 A1 | * | 1/2004 | Hillhouse ................... 382/125 |
| 2005/0235148 A1 | * | 10/2005 | Scheidt et al. .............. 713/168 |

FOREIGN PATENT DOCUMENTS

WO      WO 03065169 A2 * 8/2003

OTHER PUBLICATIONS

Cohen, "Operating System Protection Through Program Evolution", Computers & Security, vol. 12, No. 6, Oct. 1, 1993, pp. 565-584.

Kim, "Biometrics, Is it a Viable Proposition for Identity Authentication and Access Control?", Computers & Security, vol. 14, No. 3, 1995, pp. 205-214.

International Search Report from International Application No. PCT/CA2002/000999, dated Aug. 26, 2003.

* cited by examiner

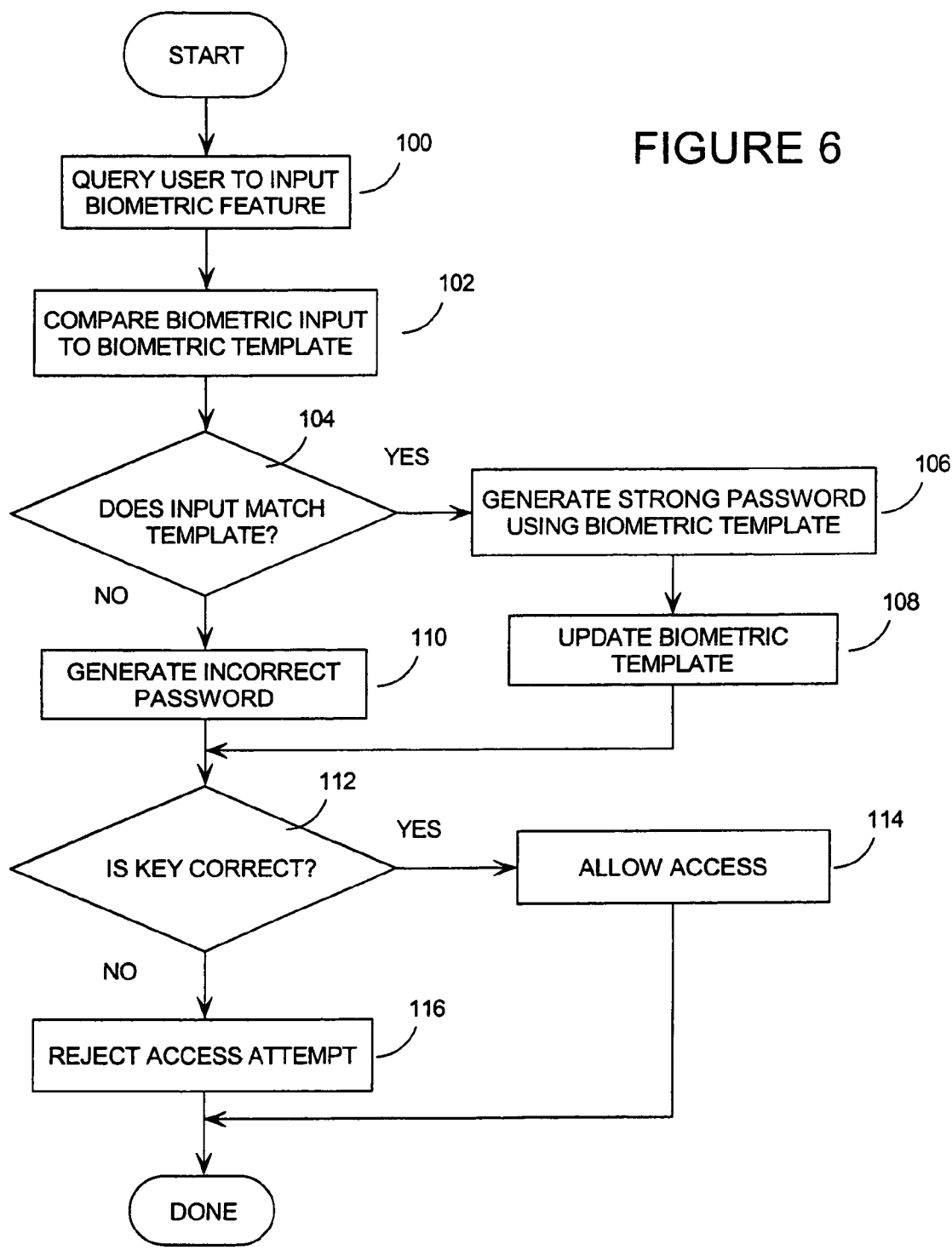

SECURE METHOD AND SYSTEM FOR BIOMETRIC VERIFICATION

The present invention relates generally to computer software, and more specifically, to a method and system which allows biometric verification to be securely performed.

BACKGROUND OF THE INVENTION

In recent years, personal computers and digital communication systems have become pervasive in industrialized nations. Along with this growth, the speed and power of these systems are now at the point where any subject matter including date, images, audio, video and software can be stored, transferred and reproduced with ease.

A great deal of the information and software that resides on these systems, is not intended for general public access. To name just a few examples, individuals may have personal data on-line such as tax and banking information, businesses may have sales data and licensing agreements, and software suppliers may have made valuable software available only to those who properly purchased it. It is therefore necessary to restrict access to certain software and data content.

There are a variety of techniques for restricting access to secure data and software, the most common one being the use of secret passwords (i.e. a software application, for example, will only run if the user inputs the password that the software application requires).

However, users are inundated with passwords. Not only do they have a password for their ATM machine, they have a password for every web site on the Internet that they visit: banking, brokerage services, online stores and other services. On top of this, there are passwords at work for the network, files and applications.

A good password has high entropy—it is highly differentiated and hard to guess. Strong passwords, or pass phrases, can be created if they are long, case sensitive and use non-alphanumeric characters (e.g. "too BEE or N0t 2B, that !S the ?"). In the real world however, it is impractical to expect users to employ multiple, long, and different pass phrases for their different accounts.

Thus, passwords have a number of drawbacks including the following:
 strong or complex passwords are easily forgotten, or avoided altogether;
 if a user does have a large number of passwords, the same password is often used for everything. Once an attacker discovers the password to just one application, they have access to all of an individual's online (or local) personal data and history, including any private keys. If a user does decide to use a different password for each application, he often has to write them all down—which provides another avenue for attack;
 they are easily shared, knowingly or not; and
 they are easy to guess and/or attack because they do not have a lot of randomness, or entropy. Users often select alpha-numeric character strings that are easy to remember such as birth dates, names of family members and words that may be found in the dictionary.

If that is not sufficient, there are password-cracking tools which test all the words in a dictionary and other obvious combinations in a few minutes. A weak password is uncovered in seconds.

As a result, research is being done into suitable replacements for passwords. One such area of research that has particular promise is that of "biometric identification". Biometric identification relies on the fact that all humans are different in their physical characteristics, and therefore, it is possible to distinguish between any two people based on these differences. Hair color, height, and the sound of a voice are simple examples of how people are different from one another. Combined, these differences create our identity and make us distinct from each other.

In the context of software and data access control, biometrics may use one or more unique characteristics to identify a person, or verify that a person is who they say they are. Biometrics work by matching or comparing a person's unique traits with stored data (the "biometric template" for the user) in two general categories: physiological characteristics and behavioural characteristics. Physical indicators include iris or retina patterns, fingerprint, facial structure, or hand geometry. Behavioural traits may include voiceprints, typing recognition (for example, the timing between keystrokes) and handwritten signatures.

Biometric identification has the following advantages over traditional passwords:
 it is based on a person's physical traits, so there is nothing for the user to remember or forget; and
 it cannot be knowingly or unknowingly shared (to a degree, behavioural biometrics can be compromised in this manner, though a user can alter his behavioural biometrics); and it is attack resistant due to the great quantity of data that it contains.

While biometrics seem like a perfect substitute for passwords, they have one major drawback: the software that is used to manipulate biometric data is generally easy to compromise. For example, if an attacker can locate the line of software code which determines whether an input biometric matches the stored data, the attacker can modify this conditional branch to allow all access attempts to be successful. Biometric verification systems generally do not require a 100% match between a given access attempt and the stored template data, but only require a match that is statistically significant. Thus, a related attack is to lower the statistical threshold so that the attacker is able to obtain access.

Alternatively, the software code can be analysed to identify the stored data to which inputs are compared (the stored biometric template), and this stored data can be used as the input on subsequent access attempts. Each user has a finite number of biometric traits, so security of the stored biometric template is paramount. Once a user's thumb print has been compromised, it can never be reliably used again.

Thus, biometric solutions are implemented as a replacement for passwords, or to provide a secret, but only in the following situations:
 when the biometric verification is done on a secure server; or
 when the biometric verification is done on secure hardware.

If used without such precautions, an attacker could obtain access to a user's original biometric data or stored biometric template. Once this biometric data has been compromised, it can never be used with confidence again.

The use of a secure server has many drawbacks:
1. high cost;
2. difficult to deploy, as new users must be confirmed to the secure server and they may be remote from it;
3. each user's system must be compatible with the secure server, so this is not a flexible solution;
4. the secure server becomes a high-value target for attack. If an attacker can successfully access the biometric data on the secure server, he could render all of the biometric traits stored on the central server unreliable as passwords. Until the attacker is detected, he could masquerade as the users;

5. biometric sign-on data may not be secure because this data must be transmitted to the secure server over a communication network, and therefore can be intercepted by an attacker;
6. the user will not have access to secrets, keys and secure data when either the network connection is down, or the secure server is not available; and
7. users generally do not trust governments and other organizations to store or use their biometric data, so there will be reluctance to use the secure server.

The concept behind secure hardware devices is that a physical device is attached to the port of a computer. The secure hardware device reads inputs from the user, and only outputs passwords and/or cryptographic keys—biometric data is stored on the physical device, but never leaves it. Any data or software applications that are developed under the secure hardware device's control, can only be accessed again if the same biometric feature is read. The Sony FIU-710 "puppy" and BioScrypt reader are examples of such devices.

While this may sound effective, there are a number of problems with these devices:
1. they are high in cost, as a separate physical device must be supplied for each computer;
2. they are inflexible, in that they are designed to read a certain biometric feature and produce a password or key in a certain format. Neither of these can be changed; and
3. if the device is lost, broken or the user's biometric feature falls outside the allowable range (due to a cut or chapped finger, perhaps), the protected software and data may be lost forever.

Thus, a more effective method and system of handling biometric passwords is required.

One application area of particular concern for those in the data security industry is the area of wireless devices. Cellular telephone manufacturer Ericsson forecasts that there will be more than 500 million Internet-enabled mobile devices in use by the year 2003. With each of these devices being able to perform mobile commerce (m-commerce) transactions, the need for device security is quite clear.

Mobile e-commerce suppliers have managed to secure the wireless communication of information, but have had the same difficulties noted above, in securing the devices themselves. Thus, if a portable device is lost or stolen, the owner's identity and data may easily be compromised.

There is therefore a need for a method and system of biometric verification which is secure against attack. This method and system should be suitable for implementation on portable devices such as wireless telephones, smart phones, personal digital assistants (PDAs) and laptop computers, as well as hard-wired devices such as desktop computers.

SUMMARY OF THE INVENTION

It is therefore an object of the invention to provide a novel method and system of access control which obviates or mitigates at least one of the disadvantages of the prior art.

One aspect of the invention is broadly defined as a method of biometric verification comprising the steps of: establishing parameters of a software application; generating a biometric template from a set of user's initialization biometric data; generating an access software application based on the software application parameters and the biometric template; and securing the access software application using tamper-resistant software techniques, thereby allowing the access software application to be stored locally, yet be secure.

Another aspect of the invention is defined as an electronic device operable comprising: means for establishing parameters of a software application; means for generating a biometric template from a set of user's initialization biometric data; means for generating an access software application based on the software application parameters and the biometric template; and means for securing the access software application using tamper-resistant software techniques.

BRIEF DESCRIPTION OF THE DRAWINGS

These and other features of the invention will become more apparent from the following description in which reference is made to the appended drawings in which:

FIG. 6 presents a flow chart of a method for performing biometric "verification" in an exemplary embodiment of the invention.

DESCRIPTION OF THE INVENTION

The biometric verification technique of the invention is implemented in two stages: enrollment, and verification.

During the enrollment stage, the user establishes an access account which requires him to provide a number of samples of the biometric trait that is being used to confirm his identity. These samples are processed and used to create a biometric template which is stored so it can be used in the verification stage; and.

During verification, the user enters an access copy of his biometric trait, which is processed and compared to the stored biometric template. If the input data is sufficiently close to that of the stored data, then access is granted; otherwise, access is denied.

Figure 1:
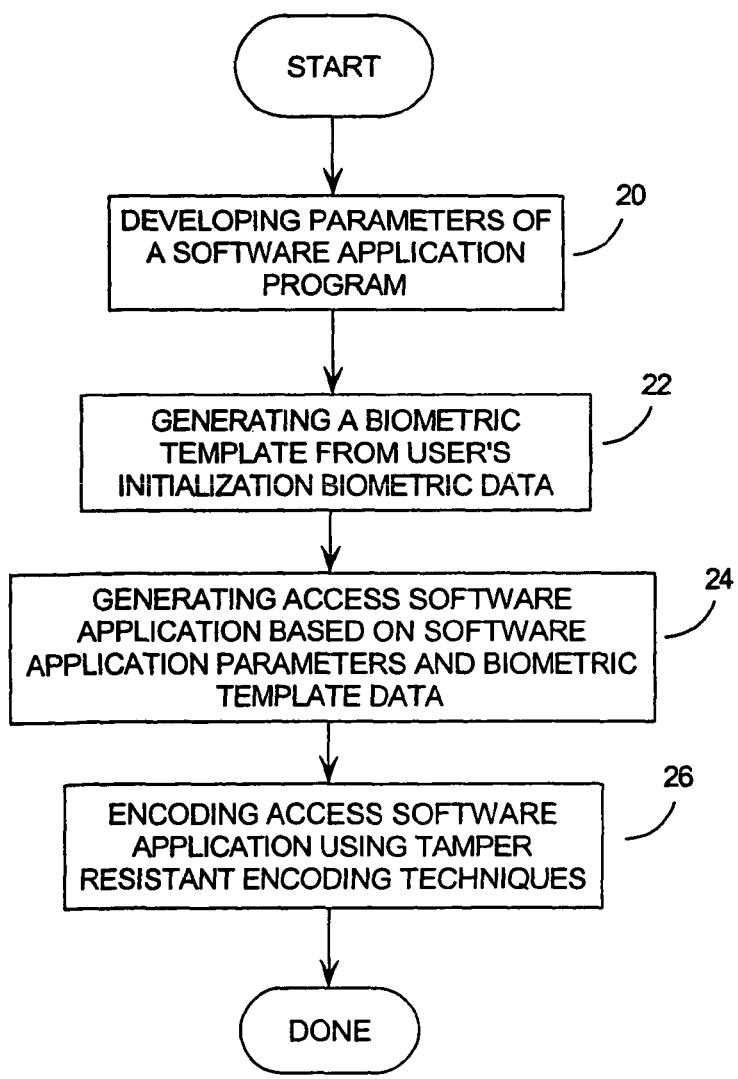
FIG. 1 presents a flow chart of a general algorithm for implementation of the invention.

The broad methodology of the invention, which addresses the objects outlined above, is presented as a flow chart of FIG. 1. This figure presents a method for performing biometric verification which proceeds generally as follows.

First, the parameters of the secure access software application program itself, are established at step 20. The term "secure access software application" refers to a biometric software application which is intended to control access to any manner of software entity including any other particular software application, data file, hard disk partition, directory or subdirectory, or entire system. Many such secure access software applications are currently available, or one could be developed along the lines of the embodiments described herein.

In some cases, the majority of the parameters set at step 20 will be established during the installation of the software application on the system (such as ensuring compatibility with the platform setting user preferences and defaults, etc.). If the software application is intended to control access to the computer itself, then most of these parameters will be fixed.

Step 20 would generally be effected using a command line, or GUI (graphic user interface), with which the user sets the desired values for these parameters.

Next, the algorithm will generate a template of the user's biometric trait that is being used to control access, at step 22.

The algorithm for effecting this step will depend on the biometric trait being used. Several examples are described in greater detail hereinafter, but in general, this will require the retrieval of data samples from an input device and some manner of pattern recognition processing to extract the commonalities between the data samples.

The invention can be used with any type of biometric trait, though the nature of the trait will have an impact on at least steps 22, 24, and 26 of the invention. More details are provided hereinafter, but it is clear that the invention may be applied to all manner of biometric traits including iris, retina, fingerprint, facial structure, voice prints, typing recognition, handwritten signatures and other traits as known in the art.

The access software application is then generated at step 24 by merging the biometric data from step 22 and the parameters set at step 20 with the software application itself. In some cases this may require the compilation and storage of high level computer code as executable code, while in other cases it may simply be the step of linking an already executable software application to the biometric storage locations for the date template and parameter data. The invention is not limited by the manner in which this is done.

The access software application is then encoded using tamper-resistant software (TRS) encoding techniques at step 26. Protecting the access software application using TRS encoding techniques prevents attackers from analysing the operation of the biometric verification software, which prevents attackers from:

1. discovering the precise biometric data for a certain user, precluding any reliable future use of it;
2. borrowing the access software code and using it to masquerade as the user for the same or another application; or
3. altering the line of code which ultimately sets the precession of the biometric comparison. An attacker could set the threshold so low, that all access attempts are considered successful.

A number of tamper-resistant software (TRS) encoding techniques are known in the art. Encoding software into a TRS form frustrates the attacks of hostile parties in at least the following ways:

1. it generates software which is "obscure"; that is, software whose inner workings are incomprehensible; and
2. it generates software which is "chaotic" in that a modification at any point will almost certainly produce a nonsensical result.

The obscurity of TRS, and its chaotic response to tampering, are both relative rather than absolute. As in the case of the obscurity provided by cryptography, these properties are removable in principle: however, we can make the required effort for such removal expensive for the attacker. TRS techniques which are particularly effective in biometric verification applications are described hereinafter.

The requirement for making this approach viable is that reversal of the TRS obscurity be prohibitively expensive for the attacker. This is achieved by an extremely heavily protected form of access software. Within limits, the access software can run slowly and consume a lot of memory, providing a maximum of freedom in the conversion techniques used to convert the access software to tamper-resistant form. Also, the more computer resources required to run the access software, the harder an attack will be: an attacker needs many runs for cracking whereas regular operation required just one run.

While FIG. 1 implies that the step of tamper-resistant encoding (step 26) must be done after steps 20, 22 and 24, the invention is not so restricted. In fact, the step of tamper-resistant encoding can be performed at any point in the algorithm. For example:

1. the encoding could be performed immediately before step 20, that is, encoding the access software application before any parameters are set or biometric values have been entered. This maximizes the flexibility of the implementation—the encoded access software could easily be sold or distributed as it could run on any platform. However, this convenience would be at the expensive of reduced security since it means that the parameters and biometric data could not be combined with the TRS protected code. It is preferable to integrate the parametric and biometric data with the access software by means of "partial evaluation" prior to encoding. That is, inserting the actual parametric and biometric data values into functions and equations in the access software code, before reducing the code and performing the TRS encoding. At the very least, TRS encoding the parametric and biometric data values will cause the data to be obfuscated—in many cases, the data values themselves will be combined with other data values and disappear altogether;
2. the encoding could be performed after step 20, but before step 22, which would fix the parameters into the access software application when it is TRS-encoded. This has somewhat less flexibility in that the TRS-encoded access software can only be implemented in an environment consistent with the fixed parameters, but is not tied to the biometric data. Thus, the TRS-encoded access control software becomes usable on many similar devices with identical parameters, and for many different users with their differing biometrics. This embodiment is described in greater detail with respect to the PDA embodiment hereinafter. Note that the biometric data can be protected in other ways when using this embodiment. For example, the biometric data can be encrypted using simple symmetric encryption, the symmetric key being generated as part of step 20. When the access software is TRS-encoded, the symmetric key can be partially evaluated and TRS-encoded with the access software. In this way, the biometric data will be encrypted, but the encryption key will be obfuscated along with the rest of the access software; or
3. the encoding could be performed after step 24. This embodiment is the least flexible but the most secure. Once the TRS encoding has been performed, the access software will be bound to a particular set of biometric data, and to a particular platform. The usual procedure in preparing TRS, is to "throw away the key" after the encoding is performed. That is, to destroy the encoding information, intermediate values and variables, used to perform the TRS encoding, after it has been completed. Thus, not even the owner can reverse engineer the encoded software. For use in connection with computing environments having very limited hardware resources (such as PDAs), this approach requires cross-generation of the TRS. That is, the TRS encoding must be performed on a platform with significant hardware resources, after which it can be downloaded to a resource-weak platform such as a PDA.

Thus, the method of the invention enables a biometric verification strategy in which personal biometric data is obscured so it cannot be compromised by an attacker. A secure server or secure hardware device is not required, as there are no biometric data stored in an unprotected form anywhere on the system.

The preferred embodiments described hereinafter provide many further advantages over the prior art.

PREFERRED EMBODIMENTS OF THE INVENTION

First, by means of background, it is noted that the method of the invention may be applied on virtually any computer or microprocessor-based system. An exemplary system on which the invention may be implemented, is presented as a block diagram in FIG. 2. This computer system 30 includes a display 32, keyboard 34, computer 36 and external devices 38.

Figure 2:
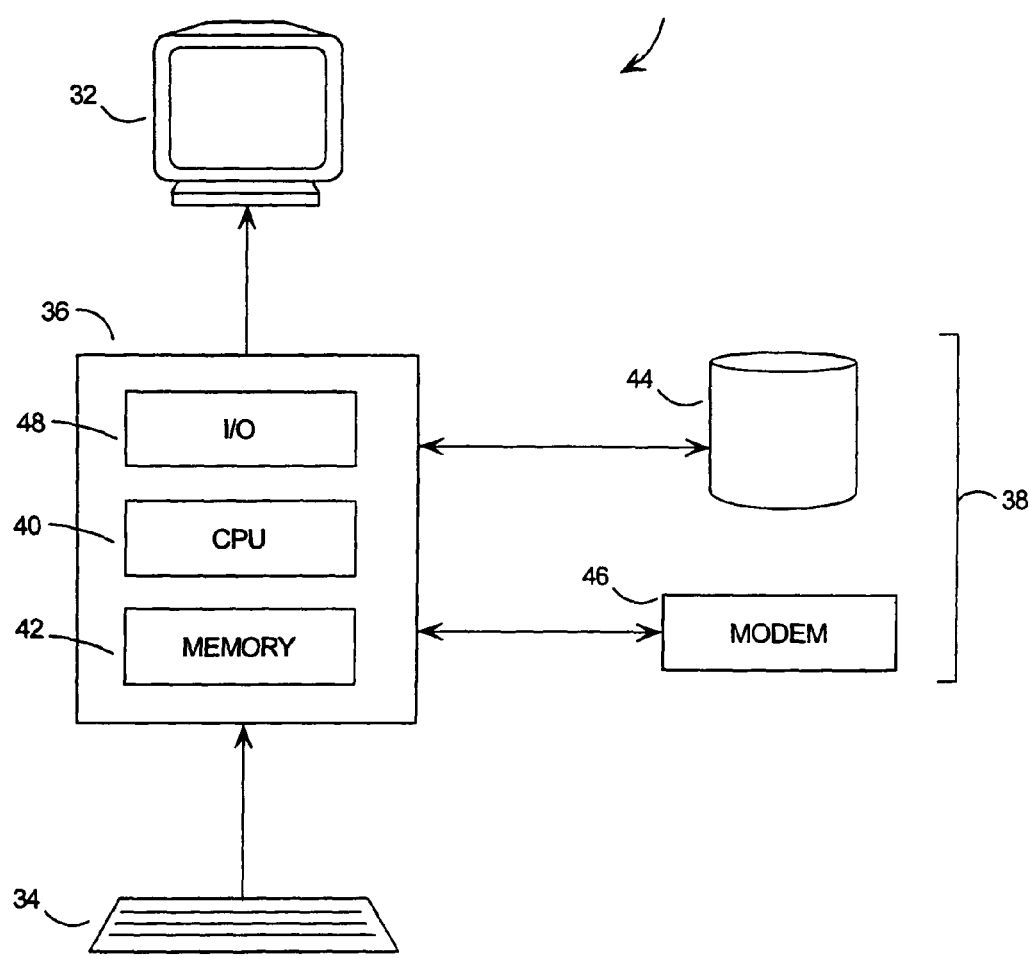
FIG. 2 presents an exemplary computer system in which the invention may be embodied.

The computer 36 may contain one or more processors, microprocessors, digital signal processors or micro-controllers, such as a central processing unit (CPU) 40. The CPU 40 performs arithmetic calculations and control functions to execute software stored in an internal memory 42, preferably random access memory (RAM) and/or read only memory (ROM), and possibly additional memory 44. The additional memory 44 may include, for example: mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 44 may be physically internal to the computer 36, or external as shown in FIG. 2.

The computer system 30 may also include other similar means for allowing computer programs or other instructions to be loaded. Such means can include, for example, a communications interface 46 which allows software and data to be transferred between the computer system 30 and external systems. Examples of communications interface 46 can include a modem, a wireless transceiver, or a network interface such as an Ethernet card, a serial or parallel communications port. Software and data transferred via communications interface 46 are in the form of signals which can be electronic, electromagnetic, optical or other signals capable of being received by communications interface 46. Multiple interfaces, of course, can be provided on a single computer system 30.

Input and output to and from the computer 36 is administered by the input/output (I/O) interface 48. This I/O interface 48 administers control of the display 32, keyboard 34, external devices 38 and other such components of the computer system 30.

The invention is described in these terms for convenience purposes only. It would be clear to one skilled in the art that the invention may be applied to other computer or control systems 30. Such systems would include all manner of appliances having computer or processor control including telephones, cellular telephones, televisions, television set top units, point of sale computers, automatic banking machines, lap top computers, servers, personal digital assistants (PDAs) and automobiles.

Second, while exemplary embodiments described herein focus on particular applications and biometric techniques, the method of the invention may be applied to any manner of biometric verification.

As noted above, biometrics is the study of measurable biological characteristics, exploiting the uniqueness of each person's physical and/or behavioural traits. Biometric systems generally consist of both hardware and software components, the hardware component being used to capture the desired trait, and the software component interpreting the data and determining whether an access attempt should be considered acceptable. Typically, a 100 percent match is not required to be acceptable—only a statistically significant match.

The most common biometric techniques are:
1. Fingerprint Recognition
   Fingerprint scanners typically shine a light against a user's finger, the reflection being picked up by a CCD (charge-coupled device) camera. The image of the finger is processed by the computer to which the device is connected, recording certain data points, called "minutiae", which describe the fingerprint layout. This technique is highly accurate, but somewhat expensive in that a separate physical input device is required for each computer;
2. Face Recognition
   This technique uses a camera to capture the image of a face, and then software to extract facial pattern information. Facial pattern information may include feature sizes and relationships such as nose length and the distance between the eyes. This technique is unobtrusive as facial data can be captured from a distance, and while the user is moving around. However, the camera may be expensive and processing is CPU-intensive;
3. Iris Patterns
   The coloured band of tissue that surrounds the pupil of the eye is complex, with a variety of characteristics unique in each person. An iris recognition system uses a video camera;
4. Retina Recognition
   Probably the single most secure biometric technique of all, these biometric systems rely on the uniqueness of the retina: the layer of blood vessels located at the back of the eye. The retinal image is difficult to capture—during enrollment the user must focus on a point while holding very still so the camera can perform the capture properly. While effective, this technique is expensive as a sophisticated camera must be used, and it is invasive as the eye must be placed very close to the camera;
5. Hand Geometry
   With this system, the user aligns a hand according to guides on the hand reader hardware, and the reader captures a three-dimensional image of the fingers and knuckles, storing the data in a template;
6. Finger Geometry
   These devices are similar to hand geometry systems. The user places one or two fingers beneath a camera that captures the shapes and lengths of certain fingers and knuckles;
7. Palm Recognition
   Similar to fingerprint recognition, palm biometrics focus on the various textures, such as ridges and other minutiae, found on the palm of the hand;
8. Voice Recognition
   This method captures the sound of the speaker's voice and possibly linguistic behaviours. Voice recognition techniques are already in use in telephone-based security applications.
   One obvious problem is that the system could be fooled by a tape recording of a user's voice, thus, some systems request a different phrase to be read each time. This increases the complexity of the verification, the time needed to perform it, and the demands on system resources;
9. Signature Recognition
   Signature recognition techniques measure distinguishing features in the user's signature and may also measure distinguishing features of the process of signing. Basic signature verification systems for example, consider the shape of a signature, as well as the points at which the pen is lifted from the paper. More sophisticated signature techniques may also include pen pressure and speed. The basic signature verification techniques may be implemented using a simple stylus and tablet, though the more advanced behavioral patterns may require a dedicated stylus and/or tablet (to measure pen pressure, for example). Signatures vary significantly over time and from one instance to another, so strong accuracy requires multiple samples and an extended verification process; and 10. Keystroke Dynamics Keyboard dynamic techniques work in conjunction with general login technology, except that when the user types in his name and password, the software measures the typing rhythm and compares it with the stored profile. The two major measures are referred to as the dwell time (the length of time you hold down each key), and the flight time (the time it takes you to move between keys). Taken over the course of several login sessions, these two metrics produce a measurement of rhythm unique to each user.

Research and development in the area of biometrics is ongoing, and advances are expected to occur continuously. Several new areas which are being examined include the analysis of DNA, vein patterns, and bodily odors.

Many of the above biometric techniques require an external input device to be attached to the user's personal computer (such as a fingerprint scanner, video camera, or pen tablet). In the exemplary implementation described herein, a PDA device is used, which has a built in stylus and pressure-sensitive screen interface. This allows the signature recognition technique to be employed with any additional external hardware.

The suitability of a particular biometric technique for a particular application depends on many factors. The most important criteria for biometric implementations are:

1. performance: the likelihood of allowing access to an attacker, or denying access to a legitimate user;
2. demand on computing resources. Some systems, like fingerprint-based systems, have very little demand on system resources. The biometric templates they use require very little storage area, and the processing required to compare an access attempt to the template, is not very CPU intensive. At the other extreme, facial recognition requires a large template to be stored, and the comparison process is very CPU intensive;
3. vulnerability to fraud. Voice recognition software, for example, may be compromised by tape-recording a user accessing their system, and playing it back later;
4. long-term stability. Some characteristics vary over time. Facial characteristics, for example, may change as a user ages, or gains or loses a significant amount of weight;
5. acceptance. Users may be reluctant to have certain biometric data extracted, such as fingerprints; and
6. ease of use. Some systems are more invasive than others. Users may not be even aware that a typing dynamic check has been added to their regular logon and password software routine. At the other extreme, retina scans require the user to put their eyes in very close proximity to the detector, and must remain still while the enrollment process is being performed. Fingerprint and palm checking also requires that the user place their finger or hand on a potentially dirty or bacteria-infected sensor that has been used by dozens of other users.

There are also other criteria which be significant in different applications.

Third, there are many TRS encoding techniques, some of which are proprietary, and some of which are known in the art. These techniques may generally be categorized as follows:

1. Cloaked data-flow concerns TRS implementation of ordinary computations on small pieces of data—the building blocks of larger computations;
2. Cloaked control-flow concerns TRS implementation of software decision making and the structure of execution, which glues all larger computations together from smaller pieces;
3. Cloaked mass data concerns TRS implementation of concepts such as files, arrays, dynamic allocation, and linked structures with potential aliasing; and
4. White-box encoding concerns cryptographic encoding of functions and transforms for an environment in which the software can be observed in complete detail without revealing I internal data, such as a secret key.

It is somewhat misleading to divide encoding techniques out in this manner. The above categories, while they are handled in different ways, are generally not handled in isolation. A significant degree of control-flow protection is achieved using data-flow encoding techniques, for example.

The variables in the control-flow statement IF X=2*PI*R THEN GO TO 100 could be data flow encoded by making the following substitutions throughout the program:

$$X'=0.5X+3$$

$$R'=R(2*PI)$$

Substituting these equalities into the control-flow statement above yields: IF 2X'−6=R' THEN GO TO 100. Thus, while only data-flow encoding has been performed, the control-flow statement has been obfuscated considerably.

We prefer that TRS be much more than simply obscure. It should also resist tampering. That is, it should preferably be aggressively fragile under tampering, so that attempts to change its functionality result, not in the desired change, but in useless pieces of nonsense code. (Avoiding a visible point of failure prevents leakage of information about why the functionality has become nonsense.) The techniques described herein, have this property.

As with encryption, the mapping from original form (plain-text or ordinary software, respectively) to encoded form (ciphertext or TRS, respectively) is one-way: it is very much easier to encrypt or cloak, respectively, than to decrypt or de-cloak, respectively, unless the secret information used in encrypting or cloaking is known.

However, the conversion of software into TRS form is not a form of encryption. Encrypted messages are useless without a key. In contrast, TRS is software which can do its job perfectly well while remaining in TRS form. This is a significant difference, and means that the applications of cryptography and the applications of TRS are orthogonal and complementary: each does something that the other cannot.

Data-Flow Encoding

By data-flow, we mean the 'ordinary computation' of a program: addition, subtraction, multiplication, division, Boolean computations, masking operations, and the like: the scalar data-flow of a program.

There are two primary aspects of data-flow encoding: obscuring the computation to hide the data which the computation manipulates, and making the computations aggressively fragile under tampering.

The obscuring is achieved by various data encodings. Even very simple encodings can provide a great deal of protection. Our simplest encoding is of the form x'=sx+d, where x is original and x' is cloaked. That is, at each point in the targeted program where the variable x appears, it is replaced with its encoding. When this is done for a large number, or all, of the variables in the targeted program, the resulting code will bear little resemblance to the original code.

An attacker may be able to deduce how unprotected software code operates because variables are generally defined with respect to "real-world" concepts and measures, and the equations will often look familiar. However, when the same program is protected by data-flow encoding, the variables will lose their "real-world" appearance, as will the equations. Thus, an attacker will not be able to obtain any useful information from a simple review and analysis of the encoded program.

Many other data flow encodings may also be made. To perform a cloaked addition of constant c to variable x for example, we simply interpret the value of x' according to $x'=s(x-c)+d$ (i.e., according to $x'=sx+k$ where $k=d-cs$) instead of according to $x'=sx+d$.

Note that the formula must subtract c. Since x' has not changed, the new formula makes x appear to be larger, which is what we want. If we to add c instead, we are actually representing the subtraction of c from x.

To add a variable instead of a constant, we need actual code, but the transform space for addition using a 64-bit implementation is over 100 bits; a brute-force attack on a space of this size is plainly infeasible (a brute-force attack is one in which all possible combinations of data values are checked until the correct one has been discovered). The mappings we use in practice vary from the simple transformations above, to complex multidimensional transforms combining multiple mathematical domains. This approach is highly effective for obscuring the data-flow.

The other aspect of data-flow cloaking for TRS is to induce aggressive fragility under tampering. This is achieved by generating code according to the following policies:

1. every computation depends on as many others as possible. This may be done simply by creating new variables which are defined as a combination of original variables;
2. the interdependencies are complex, so that, with high probability, an arbitrary change causes invalid computation to occur;
3. execution is 'fake robust': invalidities do not cause failure; execution simply continues in the form of nonsense computation. If, for example, an array A is known to have 100 elements, then converting the expression A [i] to the expression A [i mod 100] makes it fake-robust in that variable i may take on any value and not cause an array bounds error. However, certain values of variable i may cause nonsensical operation elsewhere in the program without causing a complete failure; and
4. any directed change to behaviour (i.e., any change whose result is not nonsense computation) requires that several changes, related in obscure and complex ways, be performed absolutely perfectly.

Further information on this subject is available in the co-pending patent application titled: Tamper Resistant Software Encoding, filed under the Patent Co-operation Treaty on Jun. 8, 2000, under Serial No. PCT/CA00/00678, by Stanley Chow, Harold Johnson, and Yuan Gu.

Control-Flow Encoding

The control-flow of a program refers to the decision points and branch instructions that govern which lines of code in the program are to be executed. In broad terms, control-flow encoding increases tamper-resistance by adding fake-robust, data-driven, control transfers to the software code. If a large number of control transfers are added to the software code, it will be extremely difficult for the attacker to identify the specific line of control that he wishes to analyse or modify.

Generally, control-flow encoding ensures that what was one control transfer, has been instantiated in multiple parts of the code, and that control transfers from different parts of the code are often merged into one. As the added control transfers are fake-robust, the erroneously modified program will appear to continue executing properly, while in fact it is not. Since control is exercised using a complex data-driven scheme, any attempt to modify a single control transfer will almost certainly affect others (this is described as the "anti-hologram" property), especially where multiple control transfers are often combined into one (the "togetherness" property), as they are in this invention.

As well, if the attacker makes a number of modifications, by the time the erroneous operation is discovered, it will not be possible to tell which of the modifications caused the erroneous operation.

Figure 3:
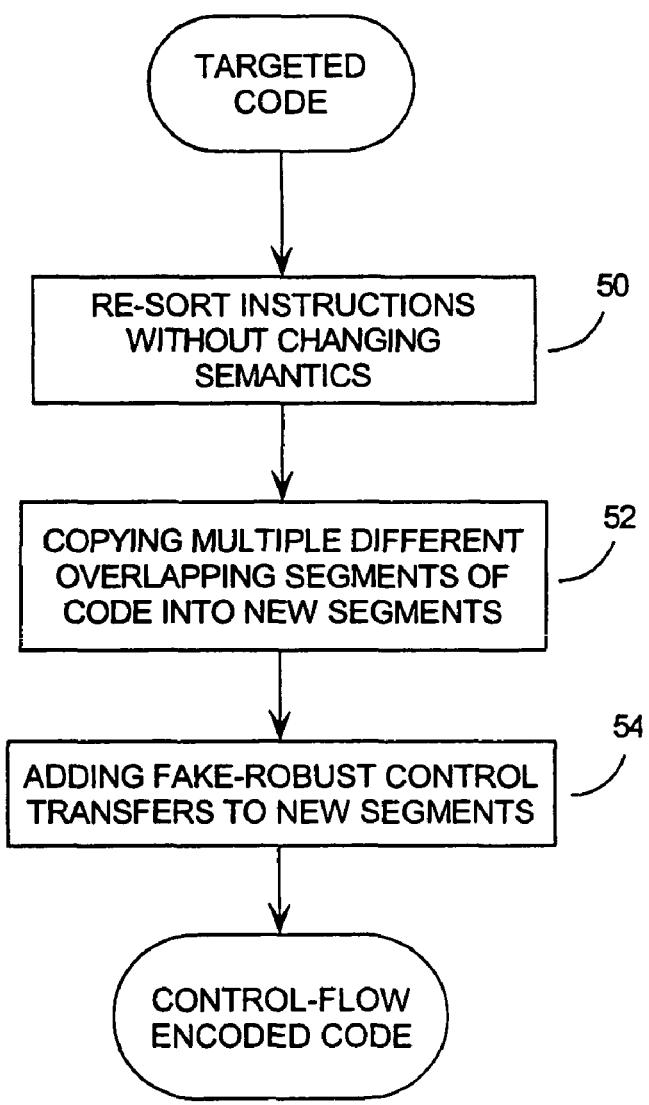
FIG. 3 presents a flow chart of a method for performing control-flow encoding in an embodiment of the invention.

The general implementation of control-flow encoding is presented as a flow chart in FIG. 3. First, at step 50, the operations in the targeted code, preferably in SSA (single-static assignment) or similar intermediate form, are re-sorted without changing the semantics of the program. When the code is in an intermediate form, the interdependencies of the intermediate statements are clear and the bounds on what re-sorting could be performed may be easily determined. The understanding of these interdependencies is what allows multi-threading and optimisation techniques as known in the art. SSA is a very commonly used intermediate form.

In the case of the invention, these instructions can be re-sorted so that a direct decompiling into high level language yields obscure results. However, an enormously greater benefit is realized with the synergy between re-sorting of the code and the creation of "fake-robust" targets at step 54. A fake-robust target is one which will appear to operate correctly when it is modified, but in fact, results in nonsensical operation.

The strategies and limitations for re-sorting the code instructions will vary between applications, and with the type of intermediate code that is used. These restrictions would be clear to one skilled in the art.

At step 52, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 54, new control transfer instructions are added to make reference to the new code segments created at step 52. These references will generally be fake-robust as they refer to the segments of the original code that were slightly modified at step 52, but will not be perfectly fake robust unless measures are taken to ensure they will not fail. Fault-resistant programming techniques are known in the art and could be implemented as desired or required.

The targeted code is now protected by control-flow encoding.

Additional details on control-flow encoding may be found in the co-pending patent application titled: Tamper Resistant Software—Control-flow Encoding, filed under the Patent Co-operation Treaty on Aug. 18, 2000, under Ser. No. PCT/CA00/00943; inventors: Stanley Chow, Harold Johnson, and Yuan Gu.

When applied extensively, control-flow encoded software is cloaked so that:
1. each original operation is represented, variously cloaked, at multiple cloaked sites;
2. a single cloaked site also represents multiple original sites;
3. there is no difference between 'decoy' and 'significant' computation;
4. cloaked routines do not preserve the boundaries of the original routines;
5. execution paths include a pseudo-random component: any change in input data causes pervasive changes to branch patterns;
6. both data- and control-flow are made fake robust: the tampering does not cause failure (traps, core dumps, error messages, or the like); it simply causes execution to continue in a nonsense fashion; and
7. all aspects of control-flow are subjected to all aspects of data-flow cloaking.

This protects the control-flow of the targeted software from standard attacks as follows:
1. Branch jamming will not work because:
   a. no specific branch can be found to jam,
   b. jammed branches subvert the operation of the data-flow functions, producing nonsensical data-flow; and
   c. multiple sites require jamming, with sizable changes to their data-flow, to achieve the effect of a single branch jamming in the original program; and
2. simplification of the control-flow encoded software is extremely difficult because:
   a. due to various data-flow cloakings, distinct sites which share 'original' functionality have quite different code;
   b. data-flow coding mixes dependencies and hence, entropy among functionalities at each site, and the mixing must be fully understood before simplification is possible;
   c. simplification requires removal of the pseudo-random component from branches, but it appears indistinguishable from the normal components;
   d. simplification requires unraveling of both the branching and the data-flow together; and
   e. almost any perturbation-based analysis on control-flow, in effect, involves branch jamming, and will fail as branch jamming will fail.

Mass Data Encoding

To convert large data structures into TRS form (arrays, linked structures, file buffers, and the like), we cloak them so that:
1. the information in the large data structures, and the addresses at which they are stored, are meaningless without the accessing code. The cloaked data structures themselves have no meaning for the data; and
2. uncloaked information appears nowhere; all aspects of such data always appear in cloaked form.

Our approach is general, and covers file input and output (I/O) as well as in-memory data structures, dynamic data structures, and aliasing.

Mass data encoding relies on the random or pseudo-random dispersion of data being stored, throughout the available memory or an area of the available memory. This dispersion makes it very difficult for an attacker to locate certain pieces of data he is searching for, and also distributes the data values with respect to one another. Thus, data are not stored in areas of the memory one might expect them to be, and there are no clearly identifiable blocks or patterns of data in the memory.

A simple technique for performing mass data encoding is to respond to a request to store a data value at a virtual address, by mapping that virtual address onto a randomly selected actual address. This mapping may be done in a truly random manner, but will generally be done in a pseudo-random manner, because of the difficulties in generating truly random numbers in pure software. A desirable technique for generating pseudo-random address is by use of a hash function, which generates what appears to be a random number from a given input. In the formal sense, the definition of a hash function is somewhat more restrictive, but it is clear in this case that any function may be employed which maps a given input onto a random or pseudo-random output.

Each time the encoded software routine is executed, it would access the stored data transparently because the pseudo-random mapping is built into the encoded program. This could allow a patient attacker to monitor all memory lookups and generate a mapping table, however, if the software routine was also protected using data and control-flow encoding, it would virtually impossible to do so.

By storing data in a dispersed manner through the available memory space, it is impossible for an attacker to obtain anything meaningful from analysing the stored memory. In the prior art, data is stored in successive or adjacent memory locations, but in the case of the invention, the memory-wise spacial relationship has been removed, and the data is now dispersed in a pseudo-random manner.

As noted above, this dispersion makes it difficult for an attacker to locate certain pieces of data he is searching for, but also distributes the data values with respect to one another. Thus, data are not stored in areas of the memory one might expect them to be, and there are no clearly identifiable blocks or patterns of data in the memory.

For example, one avenue of attacking an encrypted memory is to search for repetitious patterns. In a text document which is encrypted with a single key, a given word will appear as the same encrypted data, each time it occurs in the original document. Thus, the attacker can identify a block of encrypted code which appears to be repeated often in the memory and assume that it corresponds to a commonly used word. The attacker would start by identifying the statistically most common words, calculating a corresponding key, and determining whether the rest of the encoding makes sense in terms of that key. In English, candidates for a short encoding might include, for example: "the", "is", or "if".

With mass data encoding, each of the letters in these short words could be stored in dispersed locations in the memory. Thus, when the word "the" is stored, the codes corresponding to these three letters will not appear together, but be randomly dispersed throughout the memory. There is therefore no repetition of a code pattern in the mass data storage, for an attacker to exploit.

The following mass data encoding techniques may also be used to complement the main invention. These additional techniques may be applied collectively, or independently to obtain varying degrees of security:
1. using different hashes for different data addresses, making it more difficult for the attacker to correlate different codings;
2. varying the hashes and encryption keys while the target program is running, so that an attacker obtains no benefit from decoding only a part of the routine, at some point in time;
3. encrypting the data being stored; and
4. using data flow encoding of the address and data before even beginning the mass data encoding. In this way, the data and addresses are encoded at all times and unprotected data is never exposed.

Additional details on mass data encoding appear in: Tamper Resistant Software—Mass Data Encoding, filed under the Patent Co-operation Treaty on Apr. 12, 2001, under Serial No. PCT/CA01/00493); inventors: Stanley Chow, Harold Johnson, and Yuan Gu.

White-Box Encoding

White-box encoding concerns cryptographic computation which can be observed in complete detail without revealing internal data such as a secret key.

Most security software is designed under the assumption that the software will be applied in a secure environment, that is, in a black-box model. This is generally unrealistic, and as a result, most security software cannot withstand a concerted attack. The "white-box" encoding model assumes that an attacker will have complete access to the targeted software, and thus, the algorithm itself must be protected against analysis and modification.

The white-box techniques of the invention provide ways to make finding an embedded cryptographic key or other hidden information combinatorially difficult for the attacker, even under this severe threat model. Such methods are inherently bulkier and slower than software designed under a black-box model, but in digital mark extraction applications, the tradeoff is well worthwhile.

Figure 4:
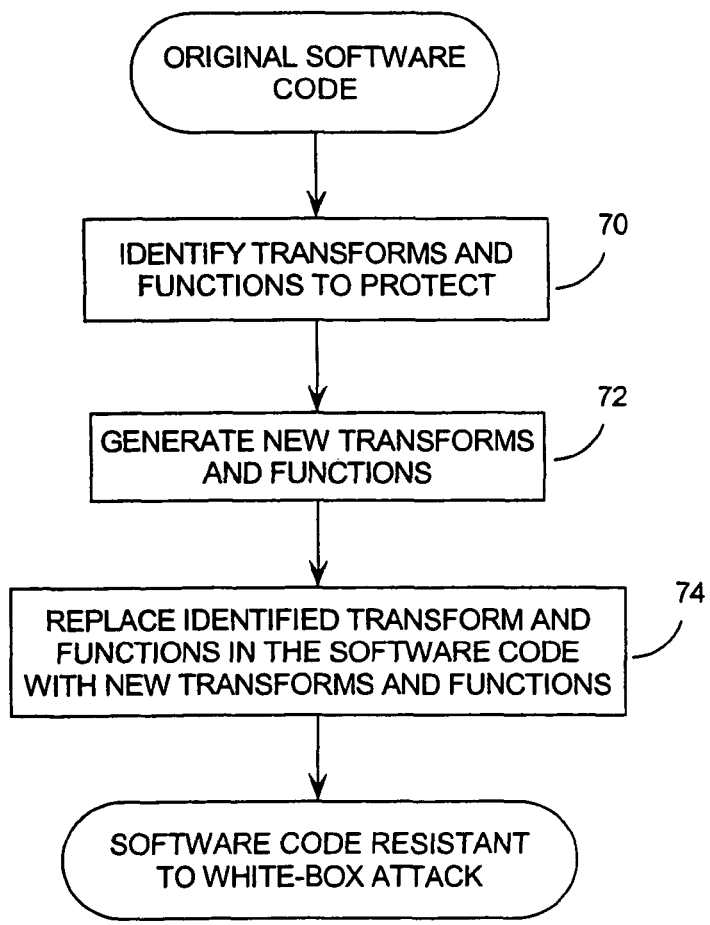
FIG. 4 presents a flow chart of a method for performing white-box encoding in an embodiment of the invention.

In broad terms, white-box encoding is implemented by as shown in the flow chart of FIG. 4. Firstly, functions and transforms substantive to the targeted software program are identified at step 70. Next, new functions and transforms which alter the processing activity visible to the attacker are generated at step 72. The identified functions and transforms are then replaced with the new functions and transforms in the software program at step 74.

A large number of different techniques may be used to encode the functions and transforms identified at step 70. These techniques may be grouped generally as follows:
1. making transforms non-linear, so they cannot be reduced by an attacker;
2. making processing activity disappear, by generating new transforms that eliminate data (such as constants) and processing steps (such as combining two transforms together into one);
3. generating new, spurious, processing activity, by concatenating random transforms to real ones, and performing input and output encodings that introduce processing activity completely unrelated to the original data; and
4. encoding and widely diffusing sites of information transfer and/or combination and/or loss.

For example, a linear transform can be replaced with a simple lookup table. If unused portions of the lookup table are filled with random data, then the lookup table becomes non-linear and irreducible.

Lookup tables can also be partitioned so that they are accessed by concatenated input variables; that is, the table is indexed by the values of two variables, concatenated together. This has the effect of replacing two variables with a single variable having a lookup table which will generally be non-linear. If a lookup table is generated for a transform concatenated with a random transform, then the lookup table will almost certainly be non-linear and irreducible.

Hence, the invention can be employed to protect any manner of software from being analysed, reversed-engineered, or simply observed to discover secure data such as secret keys. Secret keys can then be incorporated into software programs without the danger of the secret key being disclosed, or the program being altered to do anything other than what it was originally intended to do. As noted above, many digital marking algorithms employ secret keys to the extent that they contain secret data which defines the pattern of memory locations for the digital mark data, the parameters of any encoding, and the content of the digital mark itself.

More details on these and other white-box encoding techniques are described in the co-pending patent application titled System and Method for Protecting Computer Software from a White Box Attack, filed under the Patent Co-operation Treaty on Dec. 10, 2001, under Ser. No. PCT/CA01/01729; inventors: Stanley Chow, Harold Johnson, and Philip A. Eisen.

Preferred Application of TRS Techniques to Biometric Verification Systems

Typical biometric verification software has a number of characteristics that are suited for particular types of TRS encoding.

For example, biometric verification software algorithms generally process a great deal of data, both in generating biometric templates for storage, and in comparing input biometric data with the stored template. Thus, data flow encoding should generally be applied across all of the biometric verification software.

The biometric template itself may be stored as a mass data structure which could be encoded using mass data encoding techniques. In the application to the PDA environment described hereinafter, it is preferable to transform the elements in the template and also encrypt them. Any manner of encryption could be used including DES, AES, or some such symmetric key encipherment.

Note that the mass data encodings and encryptions need not be performed one element at a time. The cell sizes used in Mass Data Encoding and the block sizes used in encryption techniques can be designed to maximize the degree of obfuscation obtained.

Generally, biometric verification software has a critical decision branch which determines whether a particular access attempt should be considered a pass or a fail. Thus, this critical decision branch should be protected with control flow encoding. Because this decision branch may be handling biometric data, and possibly a "threshold" parameter of some kind, it should also be protected with data flow encoding.

The balance of the decision points in the biometric verification software should also be obfuscated with control-flow encoding as a matter of general security.

Finally, if the biometric verification software is being used to generate a strong password in response to an access attempt being successful, the function being used to generate the strong password could be protected with whitebox encoding.

It may not be practical to use whitebox encoding techniques in a PDA application due to the severely limited resources on such platforms. As well, the challenge is more replay oriented, so the resources may be better invested in variable dependant encodings.

The key point about having the full armamentarium of encoding techniques as described above (data-flow, control-flow, mass data, whitebox encoding), is that it permits us to cover a correspondingly wide spectrum of biometric verification algorithms.

An Exemplary Application: PKI and e-Commerce

On Oct. 1, 2000, the E-Sign Bill came into effect in the United States, recognizing the legal enforceability of electronic signatures. Similar bills have been passed in many other jurisdictions. This legislation will accelerate adoption of Public Key Infrastructure (PKI)—a security technology infrastructure that enables digital signatures and facilitates secure transactions from networked computers, cellular telephones or other wireless devices.

Digital signatures use asymmetric key pairs (i.e. two keys); a private key and a complementary public key, where the private key must be kept secret but the public key may be freely distributed. Files can be encoded by anyone using the public key, but only the user with the (secret) private key, can decrypt the file.

Public and private key pairs are generated using "non-reversible" functions, so it is practically impossible to calculate the private key from the public key. A "brute-force" attack on a 64-bit PKI public key, for example, would take an average of $2^{63}$ tests to identify the corresponding private key. At a rate of 100 million tests per second, this would require 2924 years to perform.

When an attacker gains access to a private key, identity theft is possible. It is similar to stealing a user's wallet and credit cards, yet faster, easier, and harder to detect. Protection is especially important on wireless devices, which are easily misplaced or stolen.

Using a secure local biometric verification technique is especially useful on wireless devices, because they are typically used and owned by one person. However, it is just as useful on wired devices such as laptops and desktops. The biometrics can allow for multiple users and effectively allow people to share these devices without impersonating others.

A local biometric verification solution is also useful in applications in which there is no connectivity to the Internet or a wireless network. Encryption of sensitive personal or corporate information on a PDA, laptop or desktop can be accomplished with a secure local biometric verification. This is becoming even more important with high capacity removable media, such as SD cards and/or memory sticks.

Software applications and cryptographic keys are typically protected with a user-supplied password—often the same password that is used for all their accounts. As noted above, the majority of user passwords are weak. These passwords are easily remembered, easily shared and easily cracked.

PKI is the most secure means of protecting data and transactions over the Internet. The key length and algorithm used, determine the strength of the system. However, if an attacker has access to a device upon which a private key is stored, the system security is only as good as the password used to protect the private key.

The invention replaces the user-supplied password with a much more secure password that resists dictionary and brute-force attacks.

An Exemplary PKI Implementation

Figure 5:
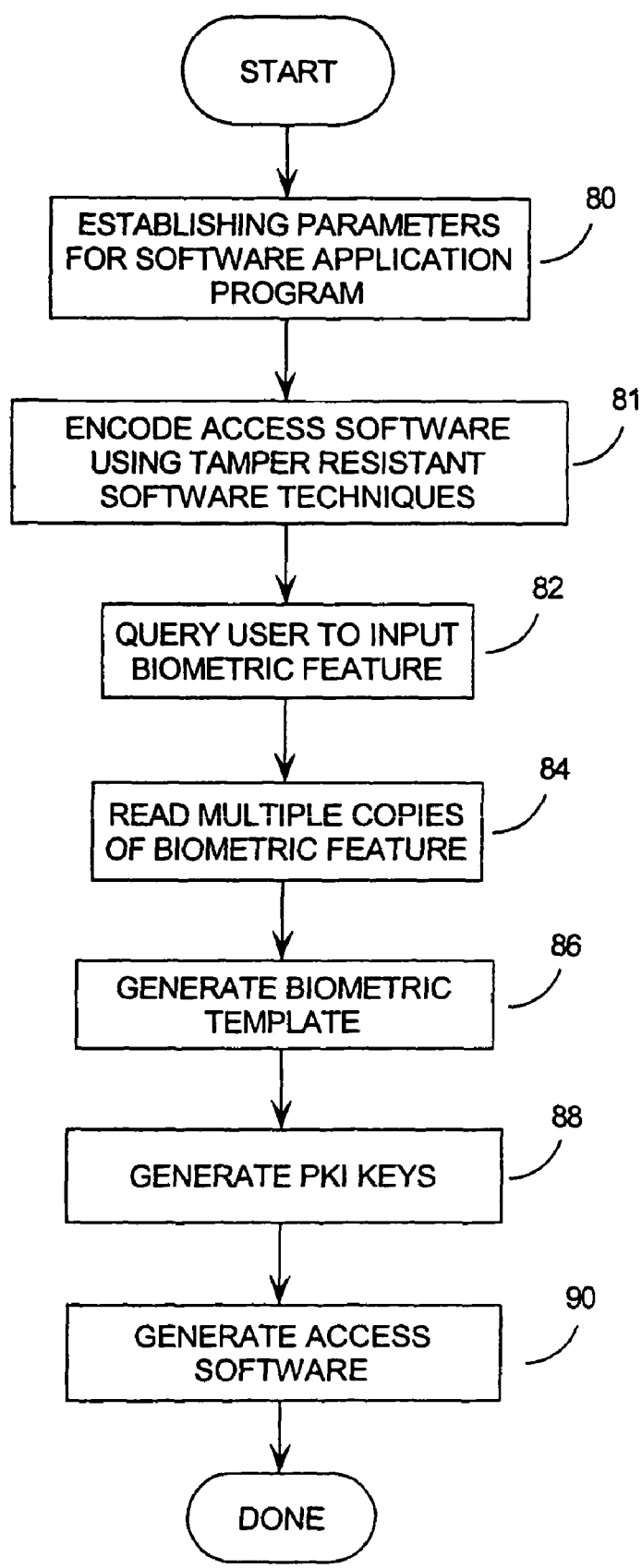
FIG. 5 presents a flow chart of a method for performing biometric "enrollment" in an exemplary embodiment of the invention.

An exemplary implementation of the invention on a personal digital assistant (PDA) using a PKI, is presented in FIGS. 5 and 6. The flow chart in FIG. 5 presents the "enrollment" stage of the process, while FIG. 6 presents the "verification" process.

Conveniently, PDAs are generally provided with a touch-screen and a stylus, so signature biometrics may be used to identify the user, without requiring an additional external device. In this embodiment, the signature biometric is used to generate a high-quality cryptography key, which is used for any external communication. Thus, biometric data never leaves the PDA. The biometric verification could, of course, be tied to any other functionality.

The enrollment routine begins at step 80 of FIG. 5, where the parameters of the secure access software application are established. This step is much like that of step 20 in FIG. 1, except that most of the parameters will be predetermined in this application. Most PDAs have very limited resources, so the flexibility of the access software will necessarily be limited. The access software itself, for example, will probably be tailored to the specific platform, so there is no need, for example, to identify the platform.

In this application, the biometric data will be encrypted, so part of step 80 is to generate the necessary encryption key or keys. In the preferred embodiment, the well known DES (data encryption standard) is used, though other techniques could be used.

As well, because of the limited resources on a PDA, the preferable application is to restrict access to the device as a whole, rather than to particular parts. Thus, it is not necessary to identify any particular software applications, data files, directories or subdirectories.

The access software application is then encoded using tamper-resistant software (TRS) encoding techniques at step 81. As noted above, the PDA does not have the resources to apply all of the TRS encoding techniques to the access software application. However, as PDAs become more powerful, it will be possible to apply more of these techniques.

As part of this step, the DES key generated at step 80, is partially evaluated and rolled into the access software. Thus, when the biometric data is obtained at step 82, it will be stored on the access software in an encrypted form. The DES key corresponding to this encryption, will not be visible to the attacker, because it has been rolled into the TRS-encoded access software.

Next, the algorithm queries the user to input a number of samples of the user's signature at step 82. As signatures vary somewhat, a number of samples are preferrably taken at this step.

These samples are then read at step 84, and a biometric template generated at step 86. Note that the biometric template does not store images of the signatures themselves, but rather characteristic data that has resulted from a pattern recognition analysis. Thus, the data from the original signatures is compressed a great deal.

The PKI key pair is then generated at step 88. When biometric data are rendered down into biometric templates, a lot of redundant information is discarded (in the same way that ZIP and JPG compression discard redundant information). Thus, the biometric template contains a great deal of pseudo-random data. This is well suited to the generation of a high-quality cryptographic key. Random key typing could be used to generate a seed value, but this embodiment uses template values (from a comparison signature that is not stored), plus some device data and the time, all hashed using SHA-1, a standard hashing function.

The access software application is then generated at step 90 by merging the biometric data from step 86 with the private PKI key from step 88 and the parameters set at step 80, with the software application itself. In the case of the typical PDA, this step will include the compilation of the application from C code into machine readible code.

The corresponding "verification" process will now be described with respect to the flow chart of FIG. 6.

When the user attempts to logon to his PDA, he will be challenged to provide an input biometric feature at step 100. In a complementary manner to step 82 above, the user will provide a written signature using the touch-screen on his PDA, and his stylus.

This biometric input will then be compared to the stored biometric template at step 102, and if a match is determined to exist at step 104, then the private PKI key is generated at step 106.

As noted above, it is not necessary to have a perfect match at step 104, but rather a statistically significant match. This is well known in the art.

Optionally, the biometric data may then be updated at step 108. In the case of signature recognition, it is prudent to perform this step for two reasons:
1. the quality of the template improves due to the additional sample population; and
2. this allows the template to adjust to gradual changes in the user's signature. However, this step may be omitted. In fact, if the biometric data has been TRS-encoded with the access software, it will be impossible to reverse-engineer the biometric data back to its original form. Thus, the biometric template could not be updated if it was TRS-encoded.

If the input biometric data is not found to match the stored template at step 104, then an erroneous key is returned to the user at step 110. This erroneous key should vary with each access attempt, such that many different keys may be produced as successive verification attempts fail.

The high-quality cryptographic key is then input into a target program at step 112. If the key is correct, access is allowed at step 114, otherwise access is denied at step 116.

Note that all of steps 100-110 are executed under the protection of TRS. Typically, the verification and key generation blocks (steps 104 and 106) are the minimum that should be protected with TRS. However, depending on performance constraints or security requirements, this could be extended to include the processing, the biometric template and even the user interface. As noted above, a key requirement of the TRS encoding is to prevent changing of the threshold used to determine a successful verification. Thus, this value cannot be adjusted by the user, but must be set prior to applying the TRS.

Thus, if your PDA, lap top, blackberry or similar device is stolen, your biometric information is protected. The attacker may be able to access the TRS-encoded code, but will not be able to obtain any biometric data in a real-world format.

If the device was stolen, the attacker could copy the TRS-encoded access software to another device, but there is no value in doing this—the attacker would still need biometric data to enable the access software. As well, the TRS-encoded access software will only work on a platform that is identical to the original platform. In this sense, the TRS-encoded access software is already bonded to the system it is on.

Just obtaining the biometric information in the form it is used internally does not help because that is not the form in which the TRS-encoded access program requires the input to be in.

By using tamper-resistant software, a local biometric verification solution can be provided that is secure and provides all the benefits of biometrics over passwords, all the benefits of a software solution, and all the benefits of a local biometric solution. Using local verification with TRS, as set out in this disclosure, then the biometric stays in the user's control and is used to unlock a PKI key. Should this key become compromised, like a credit card, it can be revoked and replaced.

The template is encrypted and customized by the TRS software so that it cannot be used anywhere other than on the original device with the original software. It is never transmitted to a server nor does it leave the user's control during normal use, maintaining privacy.

This is a radically different approach from other biometric solutions that perform the biometric verification on a remote server. In addition to privacy concerns, centralized verification solutions are a much more attractive target for hackers since all user templates are stored at the server—providing a focal point for hackers. The invention eliminates the liability concerns of server-based biometrics and diffuses potential attacks. Instead of attacking a single server to obtain thousands of biometric templates, with the invention, an attacker would need to steal thousands of PDAs to obtain the same information.

Other Options and Applications

The invention can be applied with many other options and in many other applications, including the following:
1. In addition to the TRS encoding, software applications or data files may be bonded to a specific computer.
   A machine fingerprint (such as a CPU number, NIC card number, Hard Drive volume name or number) could be generated and hashed, and then used as a key to encrypt specific data (or a private key if you also wish to bind it to a person). Biometrics tie the code to a particular user, and cloaking ties it to the executable code, which is platform specific. Bonding to a particular machine therefore provides complementary protection;
2. different "instances", not copies, of the access control program could be produced with different thresholds, different TRS encodings or other characteristics.
3. the invention could be implemented with a strategy to allow changing or renewing of the software should it be successfully attacked; and
4. while an embodiment was described using private and public key pairs, the invention could also be applied to symmetric keys, and other such systems.

While particular embodiments of the present invention have been shown and described, it is clear that changes and modifications may be made to such embodiments without departing from the true scope and spirit of the invention.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements in system resources will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

As noted above, it is also understood that computer control and software is becoming more and more common. It is understood that software encoded in the manner of the invention is not limited to the applications described, but may be applied to any manner of the software stored, or executing.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

What is claimed is:

1. A method of biometric verification using an access software application configured to access another application, system or other software entity to protect biometric data against spoofing or theft, the method comprising the steps:
   (a) establishing parameters of the access software application;
   (b) generating a biometric template for a user by sampling;
   (c) integrating into the access software application, by means of partial evaluation, the parameters and the biometric template;
   (d) performing tamper-resistant software (TRS) encoding to the access software application including storing the biometric data in an encoded format that is irreversible, the step of performing TRS encoding being performed according to one of the following:
      (i) prior to the establishing of parameters, whereby one TRS implementation covers multiple platforms and multiple biometric templates;
      (ii) after the establishing of parameters and before generating the biometric template, whereby one TRS implementation covers one platform only and multiple biometric templates; and
      (iii) after the establishing of parameters and after generating the biometric template, whereby one TRS implementation covers one platform only and one biometric template only; and
   (e) employing the biometric template which has been integrated into the access software application to evaluate biometric data provided by a user seeking to access the other application, system or software entity to provide an evaluation result which either permits or denies access by the user wherein the TRS encoding comprises mass data encoding for data in array, table or message buffer form; and
      wherein the evaluation result comprises branching to a distinct location of the access software application if the user-provided biometric data is found to match the biometric template.

2. A method according to claim 1 whereby the evaluation result comprises a cryptographic key generated to be either correct to permit access by the user or incorrect to deny access by the user, the cryptographic key being generated to be correct only when the user-provided biometric data is found to match the biometric template.

3. A method according to claim 1 whereby the evaluation result comprises a key for a symmetric cipher having high entropy for its key length, if the user-provided biometric data is found to match the biometric template.

4. A method according to claim 1 whereby the evaluation result comprises private key of a public/private key pair, if the user-provided biometric data is found to match the biometric template.

5. A method according to claim 1 whereby the incorrect cryptographic key is identical in bit-length to the correct cryptographic key.

* * * * *